United States Patent [19]

Goor et al.

[11] 4,349,526

[45] Sep. 14, 1982

[54] PROCESS FOR THE PRODUCTION OF HYDROGEN PEROXIDE

[75] Inventors: Gustaaf Goor, Hanau; Wolfgang Kunkel, Aschaffenburg, both of Fed. Rep. of Germany

[73] Assignee: Degussa Aktiengesellschaft, Frankfurt, Fed. Rep. of Germany

[21] Appl. No.: 283,194

[22] Filed: Jul. 14, 1981

[30] Foreign Application Priority Data

Jul. 18, 1980 [DE] Fed. Rep. of Germany ....... 3027253

[51] Int. Cl.$^3$ ............................................. C01B 15/02
[52] U.S. Cl. ..................................... 423/588; 564/48; 564/58; 564/61
[58] Field of Search ......................................... 423/588

[56] References Cited

U.S. PATENT DOCUMENTS

| | | | |
|---|---|---|---|
| 2,975,033 | 3/1961 | Käbisch et al. | 423/588 |
| 3,767,778 | 10/1973 | Giesselmann et al. | 423/588 |
| 3,789,114 | 1/1974 | Giesselmann et al. | 423/588 |
| 3,819,818 | 6/1974 | Giesselmann et al. | 423/588 |

FOREIGN PATENT DOCUMENTS

| | | | |
|---|---|---|---|
| 565053 | 10/1958 | Canada | 423/589 |
| 888840 | 9/1953 | Fed. Rep. of Germany . | |
| 953790 | 12/1956 | Fed. Rep. of Germany . | |
| 963150 | 5/1957 | Fed. Rep. of Germany . | |
| 1019290 | 11/1957 | Fed. Rep. of Germany . | |
| 1261838 | 2/1968 | Fed. Rep. of Germany . | |
| 1914739 | 10/1970 | Fed. Rep. of Germany . | |
| 2018686 | 10/1971 | Fed. Rep. of Germany . | |
| 2104432 | 11/1975 | Fed. Rep. of Germany . | |
| 2532819 | 1/1977 | Fed. Rep. of Germany . | |
| 864884 | 4/1961 | United Kingdom | 423/588 |

OTHER PUBLICATIONS

Chem. Abst., vol. 85, p. 20583, (1966).

*Primary Examiner*—O. R. Vertiz
*Assistant Examiner*—Wayne A. Langel
*Attorney, Agent, or Firm*—Cushman, Darby & Cushman

[57] ABSTRACT

Tetra substituted ureas wherein at least one substituent is an aryl group have proven very oxidation resistant in the anthraquinone process for making hydrogen peroxide. The urea nitrogen is directly attached to the aryl group. These ureas can be used as a single solvent or as a component of a mixture of solvents.

13 Claims, No Drawings

PROCESS FOR THE PRODUCTION OF HYDROGEN PEROXIDE

BACKGROUND OF THE INVENTION

One of the most important industrial processes for the production of hydrogen peroxide is the so-called anthraquinone process.

As is known in this process there is employed an alkyl anthraquinone as the reaction carrier, it is hydrogenated in the presence of a catalyst and the anthrahydroquinone formed subsequently is again oxidized whereby both the originally employed anthraquinone is recovered and simultaneously hydrogen peroxide also is obtained. The latter is generally removed from the process of production by extraction with water.

In order to carry out the process both the anthraquinone and the anthrahydroquinone formed in the process must be present in dissolved form. The totality of anthraquinone, anthrahydroquinone and the solvent, as is known, is the so-called "working solution".

The high requirements which are placed on the solvent in the anthraquinone process are generally fulfilled industrially only by mixtures which are so composed that they contain at least one solvent that preferably dissolves the quinone form of the reaction carrier and at least one solvent that preferably dissolves the hydroquinone form of the reaction carrier. As is known these solvents are designated according to their function as quinone or hydroquinone solvent.

Working solutions which consist of only one solvent could not previously be carried through industrially, see Winnacker-Kuchler, Chem. Technologie, Vol. 1, Anorg. Technologie I, 1970 pages 533 and 534. Several of the solvent mixtures proposed in the patent literature are collected in Table 1.

TABLE 1

| German Patent or Auslegenschrift | Quinone Dissolver | Hydroquinone Dissolver |
|---|---|---|
| 963150 | benzene | methyl cyclohexyl acetate |
| 953790 | alkylbenzene | methyl cyclohexyl acetate |
| 888840 | methyl napthalene | diisobutyl carbinol |
| 1019290 | methyl napthalene | phosphoric acid esters |
| 1261838 | alkylbenzene | phosphoric acid esters |
| 1945750 | ter. butyl benzene | phosphoric or phosphonic acid esters |
| 2018686 | aromatic hydrocarbons | tetralkyl, cycloalkyl or aralkyl substituted urea |

Giesselmann U.S. Pat. No. 3,767,778 corresponds to German Pat. No. 2018686. The entire disclosure of the Giesselmann U.S. patent is hereby incorporated by reference and relied upon.

Furthermore it is known to employ mixtures of hydroquinone solvents in addition to the quinone solvent; thus there is used according to the process of German Pat. No. 2532819 as the quinone solvent an aromatic hydrocarbon, as the hydroquinone solvent to use as the hydroquinone solvent a mixture of a tetraalkyl, cycloalkyl or aralkyl urea and a trioctyl phosphate or phosphonate. Giesselmann U.S. Pat. No. 3,819,818 corresponds to German AS 2125 159 and discloses mixtures of a substituted urea and a triaryl phosphate or phosphonate in the anthraquinone process. The entire disclosure of the Giesselmann U.S. Pat. No. 3,819,818 is hereby incorporated by reference and relied upon.

In the industrial utilization of the anthraquinone process, as has been said, the working solutions and therewith the solvents contained therein according to the cyclic carrying out of the process are supplied both to the reduction step in which the solvent in the presence of noble metal catalyst is subject to the attack of hydrogen as well as to the oxidation step in which generally at higher pressure the solvents are exposed to the attack of oxygen.

The solvents for the quinone and hydroquinone thus must not only be good solvents for the quinone or hydroquinone form of the reaction carrier but they must also be changed at little as possible in the hydrogenation and oxidation steps, besides have little solubility in water and aqueous hydrogen peroxide solutions but have such a density that in the extraction of the hydrogen peroxide with water separation of the two phases is possible without doing anything special. Furthermore they should have a low volatility but a high distribution coefficient for hydrogen peroxide in the system solvent/water and besides have as low as toxicity as possible, see Ullmann, Enzyklopadie der technischen Chemie, 4th edition, Vol. 17, page 698. Besides they should give a high yield of hydrogen peroxide.

However, previously it has proven quite difficult to obtain a substantial resistance of the solvent, i.e. a substantial avoidance of breakdown products, in the individual process steps. This was particularly difficult in the oxidation step.

In German AS 1945750 for the first time there was proposed an oxidation resistant quinone solvent, namely tert. butyl benzene.

Hereby there was designated as "oxidation resistant" in the anthraquinone process a solvent which withstood the attack of oxygen without noticable change at 140° C. for several hours, i.e. about 1.5 to 48 hours.

In German AS 1914739 indeed there are mentioned solvents which are oxidation resistant against molecular oxygen, whose yield of hydrogen peroxide however is extremely low compared to the process of German Pat. No. 2018686 (or related Giesselmann U.S. Pat. No. 3,767,778).

Therefore there have been used in order to have both a sufficient oxidation resistance and yield of hydrogen peroxide the quinone solvent together with specific antioxidants, so e.g. German Pat. No. 2104432 and related Giesselmann U.S. Pat. No. 3,789,114,. The entire disclosure of Giesselmann U.S. Pat. No. 3,789,114 is hereby incorporated by reference and relied upon.

The purpose of the present invention therefore is the use of an oxidation resistant solvent in the anthraquinone process which simultaneously guarantees a high yield of hydrogen peroxide.

SUMMARY OF THE INVENTION

It has now been found that there can be used as the sole solvent or as a component in a mixture of solvents a tetrasubstituted urea in which at least one substituent is an aryl group which is directly attached to a nitrogen atom.

These types of urea are not only oxidation resistant to a high degree in the working medium but simultaneously bring about the high yields of hydrogen peroxide which are obtained in the process of German Pat.

No. 2018686 (and related Giesselmann U.S. Pat. No. 3,767,778).

The new aryl ureas correspond to the general formula

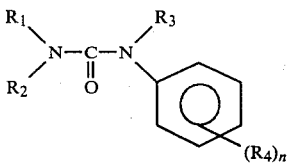

if only one aryl group is directly connected to a urea nitrogen atom.

However, it is also possible to introduce still further aryl groups directly connected to one or both urea nitrogen atoms in the molecule.

The symbols $R_1$, $R_2$, $R_3$ and $R_4$ have the general meaning $R_1$ is an alkyl group with 1 to 12, preferably 1 to 5, carbon atoms which in a given case can be substituted by one or more $OR_5$ groups, $R_5$ is hydrogen or an alkyl group with 1 to 12, preferably 1 to 5 carbon atoms, wherein the group —$OR_5$ can be in the middle or at the end of the $R_1$ alkyl chain, $R_1$ is cycloalkyl with 3 to 7 ring carbon atoms which in a given case can be substituted by one or more alkyl groups having 1 to 5 carbon atoms and/or one or more $OR_5$ group, $R_1$ is an aralkyl group in which the alkyl groups can have 1 to 5 carbon atoms and in which the aromatic ring itself in a given case can be substituted by alkyl groups having 1 to 5 carbon atoms and/or $OR_5$ groups, $R_1$ is an aryl group in which the aromatic ring itself in a given case can be substituted by alkyl groups having 1 to 5 carbon atoms and/or $OR_5$ groups;

$R_2$ corresponds to the mentioned possibilities for $R_1$ wherein $R_1$ and $R_2$ can be the same or different;

$R_1$ together with $R_2$ and a urea nitrogen can form a 5 or 6 membered heterocyclic ring which in a given case can also include a further heteroatom such as N, O, S or P, the remaining members of the ring being carbon atoms, $R_3$ has the same meaning as $R_2$ and wherein $R_2$ and $R_3$ can be the same or different;

$R_4$ is H and/or as defined for $R_1$, and n is 5.

The interaction of one or more phenyl groups directly bonded on one of the nitrogen atoms with the urea structure

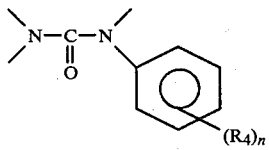

brings about a surprisingly high oxidation resistance for the organic solvent.

Examples of compounds useful as the aryl substituted ureas as solvents are:
N,N,N'-trimethyl-N'-phenylurea,
N,N'-dimethyl-N-s-butyl-N'-phenylurea,
N,N-diethyl-N'-methyl-N'-phenylurea,
N,N,N'-triethyl-N'-phenylurea,
N,N-dipropyl-N'-methyl-N'-phenylurea,
N,N-di-i-propyl-N'-methyl-N'-phenylurea,
N,N-dibutyl-N'-methyl-N'-phenylurea,
N,N,N'-tributyl-N'-phenylurea,
N,N-diamyl-N'-methyl-N'-phenylurea,
N-methyl-N-phenylcarbamoyl-N'-morpholine,
N-methyl-N-phenylcarbamoyl-N'-piperidine,
N-methyl-N-phenylcarbamoyl-N'-piperazine,
N-methyl-N-phenylcarbamoyl-N'-oxazolidine,
N,N,N'-triamyl-N'-phenylurea,
N,N'-dimethyl-N-dodecyl-N'-phenylurea,
N,N-didodecyl-N'-methyl-N'-phenylurea,
N-methoxyethyl-N-methyl-N'-ethyl-N'-phenylurea,
N,N'-dimethyl-N-methoxyethyl-N-phenylurea,
N,N'-dimethyl-N-amyloxymethyl-N'-phenylurea,
N,N'-dimethyl-N-hydroxymethyl-N'-phenylurea,
N,N-dipropoxy-N'-methyl-N'-phenylurea,
N,N'-dimethyl-N-dodecoxy-N'-phenylurea,
N,N'-dimethyl-N-cyclopropyl-N'-phenylurea,
N,N'-dimethyl-N-cyclohexyl-N'-phenylurea,
N,N-dimethyl-N'-cyclohexyl-N'-phenylurea,
N,N-dicyclohexyl-N'-methyl-N-phenylurea,
N,N-dimethyl-N-cycloheptyl-N'-phenylurea,
N,N'-dimethyl-N-benzyl-N'-phenylurea,
N,N-dibenzyl-N'-methyl-N'-phenylurea,
N,N'-dimethyl-N-phenylethyl-N'-phenylurea,
N,N'-dimethyl-N-(p-methylbenzyl)-N'-phenylurea,
N,N'-dimethyl-N-(p-methoxybenzyl)-N'-phenylurea,
N,N-dipropyl-N'-cyclohexyl-N'-phenylurea,
N,N-dimethyl-N',N'-diphenylurea,
N,N,N',N'-tetraphenylurea,
N,N'-dimethyl-N,N'-diphenylurea,
N,N-di-i-propyl-N'-methyl-N'-p-methylphenylurea,
N,N-dibutyl-N'-methyl-N'-o-methylphenylurea,
N,N-dipropyl-N'-methyl-p-methylphenylurea,
N,N,N'-trimethyl-N'-p-amylphenylurea,
N,N-dibutyl-N'-methyl-N'-p-methoxyphenylurea,
and N,N-di-i-propyl-N'-methyl-N'-p-amylphenylurea.

Especially preferred are N,N-di-i-propyl-N'-methyl-N-phenylurea and N,N-dibutyl-N-methyl-N'-phenylurea.

The new ureas can be used alone or in mixture with the customary quinone solvents such as benzene, tert. butyl benzene, xylene, tert. butyl toluene, as well as other alkyl benzenes, e.g. tetramethyl benzene, trimethyl benzene, alkyl benzene mixtures boiling at 200°–220° C. or 158°–186° C. or 205°–220° C. or 184°–202° C., ethyl propyl benzene, isodurene, toluene, 1,3-diethyl benzene and 1,4-diethyl benzene, methyl naphthalene, dimethyl naphthalene.

The new ureas also can be used alone or in mixture with the customary hydroquinone solvents such as methylcyclohexyl acetate, diisobutyl carbinol, phosphate esters, e.g. tris-2-ethylhexyl phosphate, triamyl phosphate, tributyl phosphate, triphenyl phosphate, diphenyl butyl phosphate, tricyclohexyl phosphate, phosphonate esters, e.g. dibutyl butane phosphonate, tetraalkyl, cycloalkyl or aralkyl substituted ureas, e.g. tetramethyl urea, N,N-diethyl-N',N'-dibutyl urea, N,N-dimethyl-N',N'-dicyclohexyl urea. There can be used any of the phosphate and phosphonate esters mentioned in Giesselmann Pat. No. 3,819,818.

For example there can be employed phosphates or phosphonates of the formulae

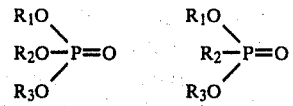

where $R_1$, $R_2$ and $R_3$ are alkyl or aryl groups which together have a total of 12 to 27 carbon atoms. Thus in addition to the phosphate and phosphonates mentioned previously there can be used for example tri-n-octyl phosphate, diphenyl octyl phosphate, diphenyl p-cresyl phosphate, tris nonyl phosphate, dioctyl methane phosphonate, dibutyl benzene phosphonate.

In fact there can be used any of the quinone and/or hydroquinone dissolvers mentioned in Giesselmann U.S. Pat. No. 3,819,818 or Giesselmann U.S. Pat. No. 3,767,778.

The ratio of hydroquinone solvent to quinone solvent can vary between wide limits, e.g., as in Giesselmann U.S. Pat. No. 3,767,778. The working solution must be composed in such manner that the customary extraction methods with water are possible in the common customary industrial apparatuses at the desired extraction temperature, see Ullmann, Enzyklopadie der technischen Chemie 4th edition, Vol. 2, pages 546–574. There has proven especially suitable volume ratios of hydroquinone solvent to quinone solvent of from 10–50 to 90–50.

The ureas of the invention are either liquid or solid and have, depending on the aryl group, a density which at 50° C. ranges between 0.9 and 1.1. In the series of N,N-dialkyl-N'-methyl-N'-phenylureas the density decreases with the number of carbon atoms in the alkyl chain and hence can be well regulated in this manner. Of course if the substituted urea is a solid it must be used concommittantly with a liquid quinone or hydroquinone solvent in which it is soluble.

In Table 2 there is collected the influence of the alkyl substitution on the density (50° C.) of the urea.

TABLE 2

| $R_1$ | $R_2$ | $R_3$ | Density (50° C.) g × ml$^{-1}$ |
|---|---|---|---|
| methyl | methyl | methyl | 1.0392 |
| ethyl | ethyl | methyl | 0.9941 |
| n-propyl | n-propyl | methyl | 0.9690 |
| n-butyl | n-butyl | methyl | 0.9499 |

The arylated ureas have both a high hydroquinone dissolving power as well as at 50° C. also a high quinone dissolving power since at this temperature they can dissolve about 200 grams of quinone per liter of arylated urea. For this reason, as already stated they can be used as the sole solvent.

It is very remarkable that the new arylated ureas also show the same other advantages as the known tetrasubstituted ureas according to German Pat. No. 2018686 (and related Giesselmann U.S. Pat. No. 3,767,778), i.e. likewise they are very resistant to alkali and temperature.

In Table 3 there are given the physical properties of one of the new aryl ureas.

TABLE 3

N,N-Dibutyl-N'-methyl-N'-phenylurea

| | |
|---|---|
| Density (50° C.) | 0.950 g/ml |
| Viscosity (50° C.) | 9.2 cP |
| Boiling point (0.3 Torr) | 113° C. |
| Solubility in Water at 20° C. | 0.01% |
| Solubility of water in the urea at 20° C. | 1.3% |
| Solubility of a mixture of 2-ethylanthraquinone and 2-ethyltetrahydroanthraquinone in this urea (anthra:tetra = 50:50) at 50° C. | 200 g/l |
| Solubility of a mixture of 2-ethylanthra-hydro-quinone and 2-ethyltetrahydroanthra-hydro-quinone at 50° C. in a mixture of several alkylated benzenes (70 Vol %; boiling range 180–220° C.) and this urea (30 Vol %) | 105 g/l |
| Density of a working solution at 20° C. | 0.955 g/ml |
| Density of a working solution at 50° C. | 0.931 g/ml |
| Viscosity of a working solution at 20° C. | 3.33 cP |
| Viscosity of a working solution at 50° C. | 1.67 cP |

There can be employed as the reaction carrier all of the anthraquinone derivatives usable for the anthraquinone process, above all the previously known alkyl anthraquinones such as 2-ethyl anthraquinone, 2-butyl anthraquinone, 2-tert. butyl anthraquinone, 2-amyl anthraquinone, 2-methyl anthraquinone, 2-isopropyl anthraquinone, 2-sec. butyl anthraquinone, 2-sec. amyl anthraquinone, 1,3-diethyl anthraquinone, 2,3-dimethyl anthraquinone, 1,4-dimethyl anthraquinone, 2,7-dimethyl anthraquinone and their entectic mixtures. Further suitable anthraquinones are set forth in Giesselmann U.S. Pat. No. 3,767,778.

The tetra substituted ureas with at least one aryl group which is directly attached to one of the two nitrogen atoms of the urea which are used according to the invention are in part new materials. Previously known according to Chem. Abst. Vol. 85, 20583 (1967) are merely N,N-diethyl-N'-alkyl-N'-phenylureas.

The aryl substituted ureas employed in the invention are best produced by reaction of N-alkyl anilines with phosgene in an inert medium and further reaction with secondary amines.

In Example 5 of the present description there is described the production of N,N-dibutyl-N'-methyl-N'-phenylurea and in Example 6 the production of N,N-di-i-propyl-N'-methyl-N'-phenylurea.

The technical advantage of the process of the invention, as already mentioned, is in the possibility of avoiding or strongly reducing the appearance of oxidative breakdowns in the working solution using the mentioned aryl containing tetrasubstituted ureas while at the same time obtaining the known high yields of hydrogen peroxide as with the previously known tetrasubstituted ureas.

It was surprising that the replacement of at least one alkyl group in the tetra substituted urea by a phenyl group which is directly attached to a urea nitrogen atom greatly increases the oxidation resistance of the tetra substituted urea.

The compositions employed can comprise, consist essentially of, or consist of the stated materials.

The invention is explained further in the following examples in which Examples 1 and 2 illustrate the oxidation resistance compared to tetra substituted ureas without an aryl substituent (Examples 1 and 2) or compared to other industrially important hydroquinone solvents (Example 2) and Examples 3 and 4 illustrate the high yield of hydrogen peroxide in the working solution.

DETAILED DESCRIPTION

EXAMPLE 1

In a gassing apparatus equipped with gassing frit and intensive condenser in each case gassing was carried out with 150 ml of the ureas set forth in Table 4 using 36 liters of dry air per hour at a temperature of 140° C. for 2.5 hours. During the test half hourly samples were drawn off and the oxidative breakdown followed by means of capillary gas chromatography. As a measure for the oxidative breakdown the decrease of the amount of urea in percentage based on the starting urea content is used. The values determined are collected in Table 4.

The superiority of the N,N,N'-tri substituted-N'-aryl ureas in comparison to the nonaryl substituted ureas in regard to the oxidation resistance can be seen from the table.

TABLE 4

| Oxidation Resistance Of Various Tetra Substituted Ureas | |
|---|---|
| Urea | Oxidation Breakdown After 2.5 hours |
| N,N,N'-trimethyl-N'-phenylurea | 0% |
| N,N'-dimethyl-N-s-butyl-N'-phenylurea | 0% |
| N,N-diethyl-N'-methyl-N'-phenylurea | 0% |
| N,N-dipropyl-N'-methyl-N'-phenylurea | 0% |
| N,N-di-i-propyl-N'-methyl-N'-phenylurea | 0% |
| N,N-dibutyl-N'-methyl-N'-phenylurea | 0% |
| N'-methyl-N'-phenylcarbamoyl-N-morpholine | 0% |
| N,N,N',N'-tetramethylurea | 2.6% |
| N,N-dimethyl-N'-di-i-propylurea | 2.6% |
| N,N-diethyl-N',N'-dibutylurea | 9.2% |

EXAMPLE 2

In a similar gassing apparatus to that described in Example 1 there were gassed in each case 150 ml of various hydroquinone solvents for 50 hours with 36 liters of dry air per hour at a temperature of 140° C. The hydroquinone solvent content in percent based on the starting hydroquinone content was determined gas chromatographically and set forth in Table 5.

TABLE 5

| Oxidation Resistance Of Various Hydroquinone Solvents | |
|---|---|
| Hydroquinone Solvent | Hydroquinone Solvent Content (%) after 50 hours Gassing at 140° C. |
| trioctyl phosphate (tris-2-ethylhexyl phosphate) | 88.3% |
| methylcyclohexyl acetate | 77.4% |
| di-i-butylcarbinol | 16.6% |
| N,N-diethyl-N',N'-dibutyl urea | 86.6% |
| N,N-dipropyl-N'-methyl-N'-phenylurea | 100.0% |
| N,N-di-i-propyl-N'-phenylurea | 100.0% |
| N,N-dibutyl-N'-methyl-N'-phenylurea | 100.0% |

The superiority of the N,N,N'-trisubstituted-N'-phenylureas in comparison to the customary industrial hydroquinone solvents in reference to oxidation resistance can be seen from the table.

EXAMPLE 3

2-ethyl anthraquinone and 2-ethyl tetrahydroanthraquinone were dissolved in a solvent mixture consisting of 70 parts by volume of tert. butylbenzene and 30 parts by volume of N,N-di-i-propyl-N'-methyl-N-phenylurea so that the resulting solution had a total quinone content (anthraquinone:tetrahydroanthraquinone=50:50) of 150 g/l. This working solution was hydrogenated with hydrogen in a circulating apparatus at 50° C. in the presence of a solid bed catalyst (palladium on silica) until the capacity limit. After the oxidation with an oxygen containing gas, e.g. air, the working solution contained 14.6 grams $H_2O_2$ per liter.

EXAMPLE 4

There were dissolved 2-ethyl anthraquinone and 2-ethyl tetrahydroanthraquinone in a solvent mixture consisting of 70 parts by volume of an alkyl benzene mixture having a boiling range of 180°–220° C. and 30 parts by volume of N,N-dibutyl-N'-methyl-N'-phenylurea so that the resulting solution had a total quinone content (anthraquinone:tetrahydroanthraquinone=50:50) of 150 g/l. This working solution was treated with $H_2$ in a similar manner to that described in Example 3. After the oxidation with an oxygen containing gas, e.g. air, the working solution contained 14.8 g $H_2O_2/l$.

EXAMPLE 5

Production of N,N-dibutyl-N'-methyl-N'-phenylurea

There was led into a solution of N-methyl aniline (2 moles) in xylene (9.5 moles) dried, gaseous hydrochloric acid (2 moles). Subsequently phosgene was introduced in the hot (100° C.) solution until all of the N-methyl aniline hydrochloride was consumed. After addition of triethyl amine (2 moles) there was dropped in at 80° C. within one hour dibutyl amine (2 moles). The precipitated triethylamine hydrochloride was filtered off, the xylene solution concentrated and the residue distilled. (Yield 99.8%, purity 99.1%).

EXAMPLE 6

The production of N,N-diisopropyl-N'-methyl-N'-phenylurea was carried out as in Example 5 except that in place of dibutyl amine there was employed diisopropyl amine.

The yield was 99.7%, the purity 98.8%.

The entire disclosure of German priority application P3027253.8-42 is hereby incorporated by reference.

What is claimed is:

1. In a process for the production of hydrogen peroxide by the anthraquinone process including the reduction in a solvent of substituted anthraquinone as the reaction carrier, subsequent oxidation thereof, removal of the hydrogen peroxide formed and return of the rejuvenated reaction and wherein the solvent comprises a tetrasubstituted urea carrier to the reduction step the improvement comprising employing as at least a portion of the solvent for the reaction carrier a tetrasubstituted urea in which at least one of the substituents is an aryl group or a substituted aryl group in which an aryl ring carbon atom of the aryl group or substituted aryl group is directly attached to one of the nitrogen atoms of the urea.

2. A process according to claim 1 wherein there is employed a tetrasubstituted urea of the formula

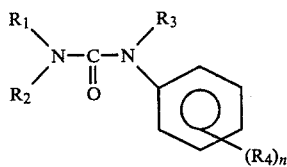

where $R_1$ is an alkyl group with 1 to 12 carbon atoms, an alkyl group with 1 to 12 carbon atoms substituted with an $OR_5$ group where $R_5$ is hydrogen or an alkyl group with 1 to 12 carbon atoms, cycloalkyl with 3 to 7 ring carbon atoms, cycloalkyl with 3 to 7 carbon atoms substituted with an alkyl group having 1 to 5 carbon atoms or with an $OR_5$ group, aralkyl having 1 to 5 carbon atoms in the alkyl group, aralkyl having 1 to 5 carbon atoms in the alkyl group and substituted on the aromatic ring by a 1 to 5 carbon atom alkyl group or an $OR_5$ group, aryl, aryl substituted by a 1 to 5 carbon atom alkyl group or aryl substituted by an $OR_5$, $R_2$ is as defined for $R_1$, or $R_1$ together with $R_2$ and a urea nitrogen form a 5 or 6 membered heterocyclic ring with up to 1 additional N, O, S or P atom, the balance of the atoms in the ring being carbon atoms, $R_3$ is as defined for $R_2$, $R_5$ is hydrogen or as defined for $R_1$ and n is 5.

3. A process according to claim 2 wherein all aryl rings present are phenyl rings.

4. A process according to claim 3 wherein $R_1$, $R_2$ and $R_3$ independently are selected from the group consisting of alkyl of 1-12 carbon atoms, cyclohexyl, methyl cyclohexyl or alkyl of 1-12 carbon atoms substituted by $OR_5$ where $R_5$ is alkyl of 1 to 12 carbon atoms, phenylalkyl having 1 to 5 carbon atoms in the alkyl group and $R_1$ and $R_2$ together are joined to form with the urea nitrogen atom a member of the group consisting of a morpholine ring, a piperidine ring, a thiomorpholine ring and an oxazolidine ring and $R_4$ is phenyl or alkyl phenyl having 1 to 12 carbon atoms in the alkyl group.

5. A process according to claim 4 wherein $R_1$, $R_2$ and $R_3$ independently are alkyl groups of 1 to 12 carbon atoms and $R_1$ and $R_2$ together are joined with the urea nitrogen atom to form a morpholine ring and $R_4$ is phenyl.

6. A process according to claim 5 wherein $R_1$, $R_2$ and $R_3$ each are alkyl of 1 to 5 carbon atoms and $R_4$ is phenyl.

7. A process according to claim 6 wherein $R_1$ and $R_2$ are both alkyl of 1 to 5 carbon atoms and $R_3$ is methyl.

8. A process according to claim 7 wherein $R_1$ and $R_2$ have 3 to 4 carbon atoms.

9. A process according to claim 8 wherein the substituted urea if N,N-di-i-propyl-N'-methyl-N'-phenylurea.

10. A process according to claim 8 wherein the substituted urea is N,N-dibutyl-N'-methyl-N'-phenylurea.

11. A process according to claim 1 wherein in addition to the substituted urea there is employed an aromatic hydrocarbon solvent for the quinone.

12. A process according to claim 11 wherein the volume ratio of substituted urea to aromatic hydrocarbon is from 10 to 50 parts of substituted urea to 90 to 50 parts of aromatic hydrocarbon.

13. A process according to claim 1 wherein the substituted urea is a liquid and is the sole quinone and hydroquinone solvent employed.

* * * * *